United States Patent Office 3,185,327
Patented May 25, 1965

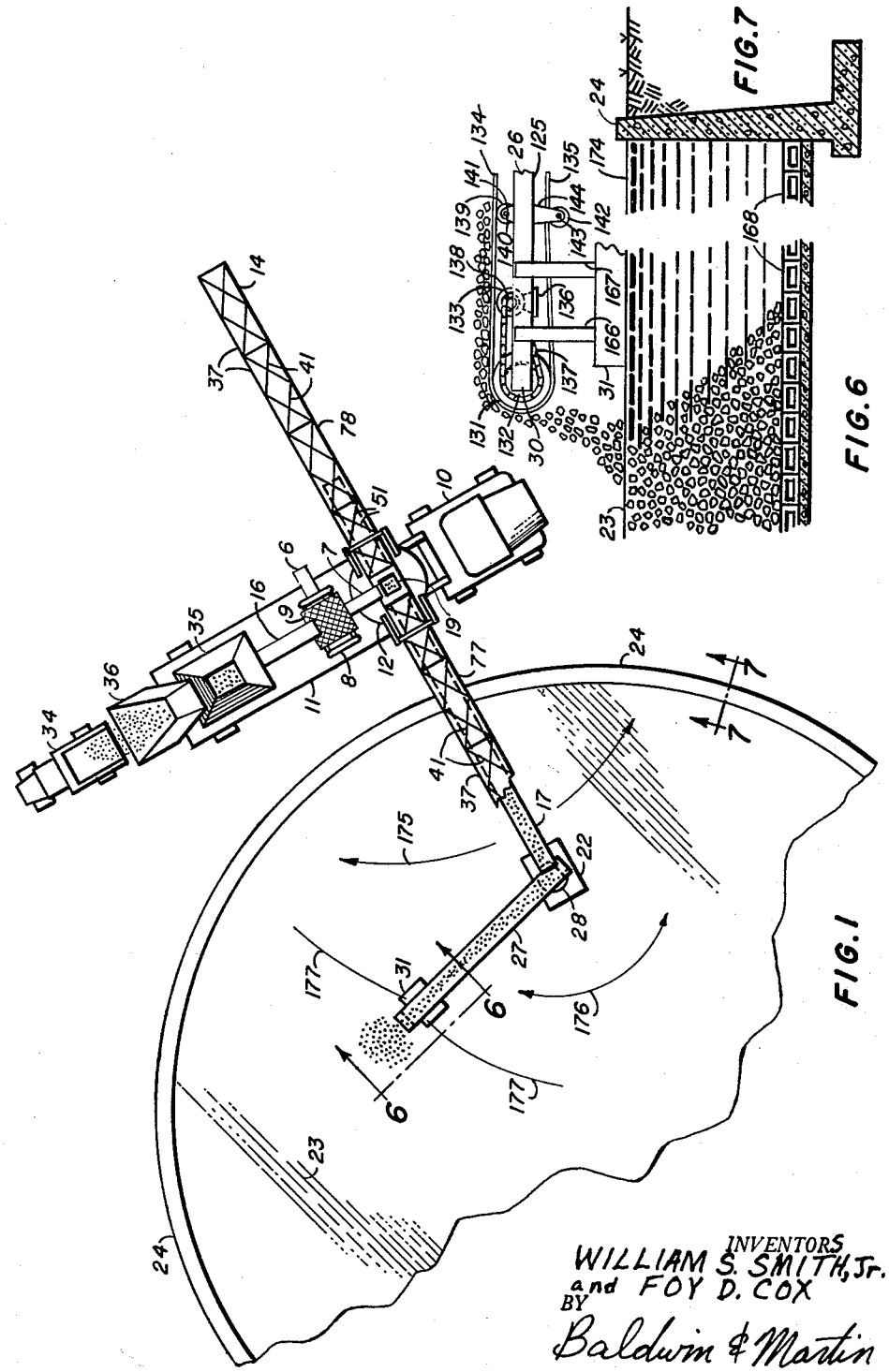

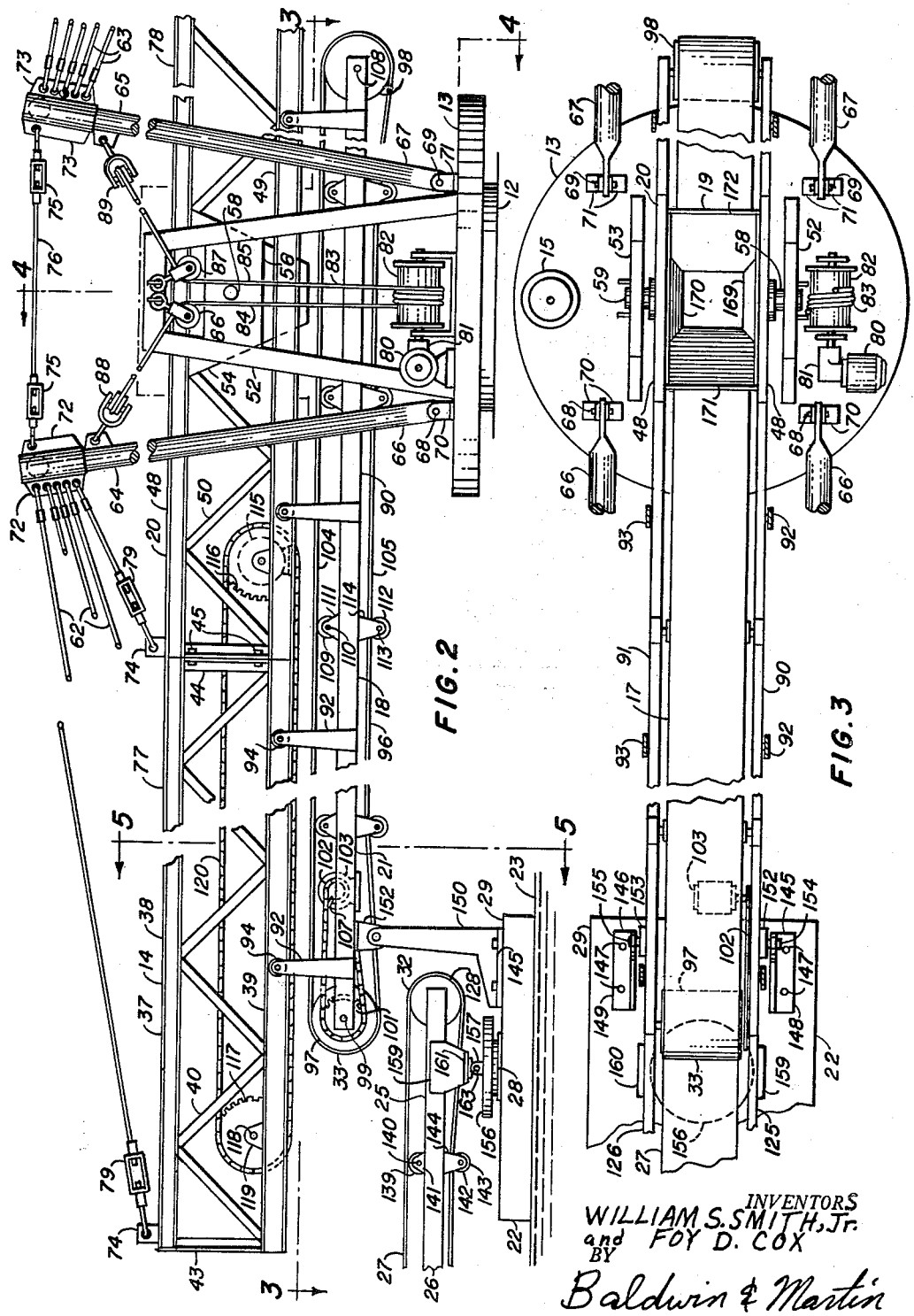

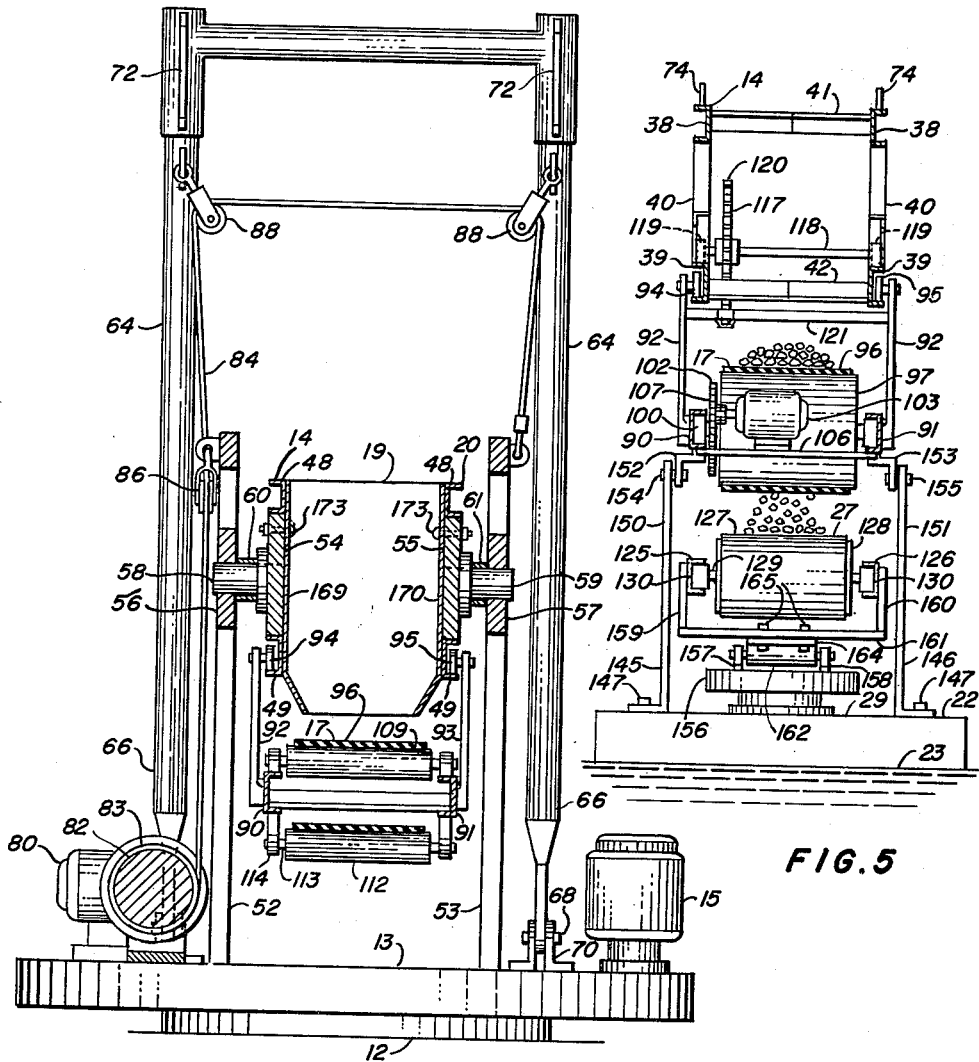

3,185,327
METHOD OF DISTRIBUTING FILTER MEDIA
INTO A FILTER BASIN
William S. Smith, Jr., and Foy D. Cox, Jacksonville Beach, Fla., assignors to Southern Aggregate Placing & Welding, Inc., Jacksonville Beach, Fla., a corporation of Florida
Filed Oct. 29, 1963, Ser. No. 319,730
6 Claims. (Cl. 214—152)

This invention relates to a distributor for use in distributing filter bed media, such as crushed rock, in filter basins of the kind used in sewage disposal plants and the like, and to improved methods of distributing the filter media in such basins.

A general object of the invention is to provide improved methods and apparatuses for distributing filter media in filter basins.

A particular object of the invention is to provide an improved method of forming a filter bed in a filter basin and in a manner which minimizes damage thereto.

Another object of the invention is to provide an improved method of distributing crushed rock in filter basins so as to reduce rouk breakage and the production of fines as the filter bed is formed during the distribution process.

Another object of the invention is to provide a mobile rock distributor for use in distributing filtes media in large filter basins and which enables distribution of the rock to be accomplished with less labor than heretofore needed to accomplish such distribution.

Filters of the kind commonly used in the sewage plants are usually relatively shallow tank-like structures that are filled with crushed rock which serves as the filter media. The sewerage is distributed over the rock bed by apparatus well known in the art, and the solid components thereof are retained in the interstices of the bed between the particles of media while the liquids drain through the bed and are thereafter pumped out. The bottom portion of the tank-like structure usually has a suitable tile covering through which the liquids can pass to a central collection point or sump. The tanks are usually cylindrical in shape and have a relatively small height dimension as compared to radial dimension. The radial dimensions frequently are 75 to 100 feet and in some cases even greater. It's apparent therefore that the amount of filter media used in forming the filter bed in such cases is large, and because of the tile-like bottom structure of the tank, there is the problem of distributing such media throughout the tank without breaking these fragile components.

Prior practices have been to lay lumber on the tile bottom adjacent to the edge of the tank and to thereafter dump loads of the previous crushed and sized rock onto such lumber. The crushed rock is then distributed into the center areas of the tank manually while the lumber serves to shield the tile components at the edge of the tank from breakage when the rock is dumped over the side of the basin. After the filter bed has been built up to the desired grade level, the lumber is removed at the point of dumping and this area is also filled to grade level with the filter media, care being taken not to break the tile thereat. These practices are expensive in manpower and are in much need of improvement. Furthermore, the repeated handling of the rock is productive of fine components that thereafter serve to choke up drainage points in the bed. The filter media is fairly closely regulated in size distribution so as to secure maximum filtration efficiency during operation of the filter and the fines produced during the distribution operation cause, of course, less efficient filter operation thereafter.

One object of the invention is to provide an apparatus for distributing the filter media throughout the entire area of the filter bed and to the desired grade level with a minimum of handling so as to avoid breakage of the rock particles.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings in which:

FIG. 1 is a diagrammatic drawing in plan view illustrating apparatus embodying the invention and wherein the apparatus is seen distributing filter media in a filter basin, certain parts of the apparatus and of the basin being removed or otherwise broken away;

FIG. 2 is a side elevational view of the boom and conveyors of the apparatus depicted in FIG. 1 as seen when the longitudinal axis of the conveyors are in parallel alignment, and further shows the vehicle turntable mounting for the boom and the pontoon supporting arrangement at the feed end of the auxiliary conveyor, certain parts of the apparatus being removed or broken away;

FIG. 3 is a section view generally along the lines 3—3 of FIG. 2 with certain components of the apparatus being broken away or otherwise removed;

FIG. 4 is an enlarged sectional view taken approximately along the lines 4—4 of FIG. 2;

FIG. 5 is an enlarged section view along the lines 5—5 of FIG. 2, and also shows rock on the conveyors;

FIG. 6 is a side elevational view as seen generally along the lines 6—6 of FIG. 1, showing a fragment of the auxiliary conveyor at the discharge end together with the pontoon supporting structure thereat; and FIG. 7 is a section view generally along the lines 7—7 of FIG. 1 through the outside wall of the filter basin.

In the embodiment illustrated a land vehicle including self-propelled tractor 10 is provided for land mobility of the apparatus. This is connected through a conventional fifth wheel arrangement to a flat bed trailer 11 of the vehicle and on which certain components of the rock handling and distributing apparatus are mounted.

The trailer 11 has a turntable 12 including a platform 13 on which an elongated boom 14 is mounted. This boom 14 is assemblable in sections at the job site, and the assembled boom 14 can be swung horizontally on the turntable 12 in either direction by operation of a motor 15. Motor 15 may be controlled from within the cab of the tractor 10.

A primary conveyor 17 is mounted on a flat framework 18, suspended from the boom in the illustrated embodiment, and the conveyor carrying framework 18 is longitudinally moveable throughout the length of the boom 14. The crushed rock is fed to the conveyor 17 through a hopper 19 located in the mid-section 20 of the boom 14.

The outer end 21 of the conveyor frame 18 is connected to and partially supported during operation on a pontoon 22. This pontoon 22 is adapted to float on the surface 23 of the water in the filter basin 24, and when the main conveyor 17 is caused to move along the boom 14, the pontoon 22 is also moved along the water surface therewith.

Pontoon 22 supports the feed end 25 of the supporting frame 26 for a second conveyor 27 through a turntable 28 that is free to rotate and which is mounted on the deck 29 of the pontoon 22. The other end 30 of the auxiliary conveyor frame 26 is supported on a second pontoon 31 which is also adapted to float on the surface 23 of the water in the basin 24. The elongated auxiliary conveyor 27 is adapted to swing horizontally about the vertical pivot axis of turntable 28 on pontoon 22 and in a manner such that the feed end 32 of the conveyor 27 is always arranged to receive the rock discharged from the discharge end 33 of the main conveyor 17.

The rear end of the flat bed trailer 11 has a hopper 35 which is adapted to receive crushed rock from a powered pick-up and dumping mechanism 36. The bucket pick-up of this mechanism 36 is vertically swingable to a position in back of the trailer to receive the crushed rock from a dump truck depicted at 34. Hopper 35 discharges onto a powered conveyor 16 suitably mounted on the trailer to receive the rock discharge therefrom, and which elevates the rock and feeds it to a sizing screen 9. This screen 9 is supported on a framework 8 secured to the trailer 11, and at a elevated position so that the sized rock retained on the screen is conveyed to hopper 19 by a chute 7. The undersized rock is received from the screen by another chute 6 located below the screen, and which discharges the rejected rock laterally of the trailer.

With particular reference to the assembled boom 14, it includes a plurality of outer sections 37 which are releasably fastened together in end to end relation at the job site, and which are secured at the opposite ends of the boom center section 20. Each of the outer sections 37 has vertically spaced upper and lower side channel members 38, 39 at its opposite sides. These members 38, 39 are rigidly interconnected at the sides of the section by inclined truss components 40. The upper members 38 are interconnected and spaced by angularly arranged cross pieces 41, whereas the bottom members 39 are rigidly interconnected by angles 42. The sections 37 are provided at their opposite ends with L-shaped angle members 43, 44 that confront the like members of the other sections in the assembled boom 14. The various sections are here releasably secured in end to end relation by bolt type fasteners 45.

The center section 20 of the boom 14 has parallel upper and lower channels 48, 49 which are interconnected and rigidly spaced at each side by suitable truss members 50. The upper channels 48 are rigidly spaced from each other by interconnecting cross pieces 51. The center section 20 of the boom 14 is mounted for pivotal movement about a horizontal axis on a pair of A-frames 52, 53. These frames 52, 53 are fixed upright on the turntable of platform 13 at the opposite sides of the section 20. The section 20 extends between the spaced frame 52, 53 and is provided with an upright plate component 54, 55 at each side of the section. These plates 54, 55 follow the general contour of the adjacent hopper side plates are fixed at the opposite sides of the section 20 to the upper and lower side channels thereat. The section 20 is pivotally connected to the cross pieces 56, 57 of A-frames 52, 53 respectively by axially aligned pivot elements 58 and 59. These elements 58, 59 are journalled in the adjacent cross pieces and are fixed to the plate components 64, 65 adjacent thereto. Suitable spacer sleeves 58, 59 are provided around the elements 58 and 59 to maintain the section 20 midway between the A-frames.

The opposite arms 77, 78 of the assembled boom 14 are guyed by wires 62, 63 to inverted U-shaped gantry members 64, 65 that straddle the opposite ends of the center section 20. The spaced legs 66, 67 of the respective gantry members 64, 65 are supported on axially aligned pivot elements 68, 69 which in turn are supported above the platform 13 by upright lug elements 70, 71. These lug elements 70, 71 are fixed to the platform 13. The inner ends of wires 62, 63 are connected to the respective upper end side brackets 72, 73 of gantries 64, 65. The other ends of the wires are releasably secured to suitable eye components 74 which are fixed to the upper side channels of the outer sections 37. Gantry members 64, 65 are adapted to swing about their respective pivot axis, and are guyed together at their upper ends by turnbuckle 75 containing side wires 76 that are secured to the insides of brackets 72, 73. Wires 62, 63 are also provided with turnbuckles 79 to facilitate the proper tensioning of the wires in the assembled boom.

The boom 14 is swung on its horizontal pivot axis through operation of motor 80. Motor 80 through a suitable gear mechanism 81 is drivingly connected to a drum 82 mounted on the turntable platform 13, with its axis of rotation generally parallel to the longitudinal axis of the boom 14. Drum 82 has several center turns of a wire rope 82 around it, and the opposite end lengths 84, 85 of the rope 82 respectively extend through spaced shives 86, 87 that are mounted on A-frame 52. From the shives 86, 87, the lengths 84, 85 extend through pairs of shives 88, 89 respectively mounted at the upper ends of the gantries 84, 85. The ends of the lengths 84, 85 are secured to suitable eye components fixed to A-frame 53. Motor 80 is reversible and when drum 82 is driven in one rotary direction, length 84 is drawn in as length 85 is payed out. This causes boom arm 77 to swing upwardly and boom arm 78 downwardly. The opposite happens when drum 82 is driven in the other rotary direction. The powered means provided for swinging the boom 14 about its horizontal pivot axis is useful in assembling the boom at the job site, and is also used to regulate the vertical swinging movement of the boom during use of to lower or raise the outboard end of the boom to the desired position and to retain the boom thereat.

The primary conveyor 17 is mounted on framework 18. This framework includes opposite side forming channel members 90, 91 which are laterally spaced and arranged in parallel. The frame 18 is suspended beneath the boom 14 by suitably spaced upright extending members 92, 93 which are fixed to the sides of members 90, 91. These members 92, 93 carry cylindrical rollers 94, 95 at their insides and which are mounted on suitable shafts therefor. These rollers 94, 95 are adapted to roll along the track ways formed at the opposite sides of the boom by the outwardly extending flange portions of the lower side channels of the boom sections.

The continuous conveyor belt 96 of conveyor 17 is trained over cylindrical end rolls 97 and 98. Roll 97 is mounted on transverse shaft 99 and the opposite ends of the shaft are journalled in transversely aligned bearings 100. These bearings 100 are carried by and fixed to the side forming channels of frame 18 and in transverse alignment at the discharge end of the conveyor. Shaft 99 is secured adjacent member 90 to a sprocket 101 for a continuous chain 102 that is driven by motor 103. Motor 103 is mounted between the upper 104 and lower 105 runs of the conveyor belt on a transverse mounting plate 106 that is fixed to the side members of the frame. The motor shaft carries another sprocket which is arranged in alignment with sprocket 101 and over which the chain 102 is trained in drivingly connecting motor 103 to roll 97.

Roll 98 is mounted on a transverse horizontal shaft 108 at the opposite end of frame 18 and shaft 108 is journalled in suitable bearings (not shown) mounted on side channels 90, 91 in transverse alignment. The top run 104 of conveyor belt 96 is supported on suitably spaced rollers 109 that are mounted on transverse shafts 110. Shafts 110 are journalled at their opposite ends in transversely aligned bearings 111 that are carried on the top faces of the side forming frame members 90, 91. The bottom run 105 of the conveyor belt 96 is supported on suitably spaced rollers 112 that are mounted on transverse shaft 113. Shafts 113 are journalled at their opposite ends in transversely aligned bearings 114 which are fixed dependingly to the bottom faces of frame side members 90, 91.

Conveyor 17 is moved back and forth in parallel with the longitudinal axis of the boom 14 by operation of a motor 115 which is suitable mounted on the boom 14 between the lower side channels of section 20. Motor 115 has a reduction gear mechanism which drives a sprocket 116 that is aligned with a sprocket carried at the outer section of the boom on a transverse shaft 118. Shaft 118 is journalled in transversely aligned bearings 119 which are mounted on the lower side channels thereat. A chain 120 is trained over the sprockets 116, 117 and the opposite ends of the chain are secured to a cross piece 121 that interconnects the spaced upright members 92, 93 at the discharge end of the conveyor.

The auxiliary conveyor 27 is mounted on a flat frame 26 which includes side forming channels 125 and 126. A continuous belt 127 is trained over a transverse idler roll 128 at the feed end of the conveyor. Roll 128 is mounted on a transverse shaft 129 which is journalled at its opposite ends in side bearings 130. These bearings 130 are mounted at the opposite sides of the frame on side members 125 and 126. The driven roll 131 is mounted on a shaft at the discharge end of the frame for rotation about a transverse horizontal axis. This shaft has a sprocket 132 keyed thereto adjacent side member 125 and is drivingly connected to a sprocket carried by motor 133. Motor 133 is mounted between the upper and lower runs 134, 135 of the conveyor belt 127 on a transverse plate 131 that is fixed at its opposite ends to the lower faces of side members 125 and 126. The motor 133 is drivingly connected to the driven roll 131 through a chain 137 which is trained over the aligned sprockets 132, 138.

The upper run 134 of the conveyor belt 127 is supported by a plurality of idler rolls 139 that are laterally spaced from one another along the frame work. These rolls 139 are mounted on laterally spaced and transversely extending shafts 140. Shafts 140 are journalled at their opposite ends in transversely aligned bearings 141 which are supported at the opposite sides of the frame on side members 125 and 126. The lower run 135 of the belt 127 is supported on transverse rollers 142 which are also laterally spaced from one another along the frame 26. These rollers are mounted on separate shafts 143 that are journalled at their opposite ends in side bearings 144. Bearings 144 are secured to the underside of the side frame members 125, 126.

The feed end of the auxiliary conveyor is supported on pontoon 22 beneath the discharge end of conveyor 17 through a turntable mechanism 28 that permits the auxiliary conveyor to freely swing horizontally about a vertical pivot axis.

The pontoon 22 has a pair of spaced L-shaped brackets 145, 146. These brackets are bolted to the deck of the pontoon 22 by bolts 147 which extend through flange components of the lower legs 148, 149 of the brackets. The other legs 150, 151 of the brackets extend upright and are pivotally connected to depending lug elements 152 and 153 that are fixed to the opposite side members 90, 91 of frame 18. This connection is made by axially aligned pivot elements 154, 155.

The turntable mechanism 28 is mounted generally centrally on the deck of the pontoon 22 and in front of brackets 145, 146 so that the discharge from the main conveyor 17 is adapted to fall onto the belt of the auxiliary conveyor 27. The turntable platform 156 has a pair of spaced upright lug elements 157, 158. The auxiliary frame 27 has a pair of depending side plates 159, 160 which are fixed to the side members 125, 126 of and at the feed end of frame 26. Plates 159, 160 are rigidly interconnected beneath the conveyor belt 127 by a transversely extending plate component 161. Plate 161 has an elongated block 162 which fits between lugs 157, 158 and is pivotally connected thereto by a horizontal pivot pin 163. Pin 163 extends through the lugs 157 and 158 and through a suitable bore in the block 162. Block 162 is provided with a flange portion 164 that engages the underside of plate 161 and is secured thereat by bolt elements 165.

The discharge end of the auxiliary conveyor frame 26 is supported on pontoon 31 by rigid upright side members 166, 167. These members are releasably secured dependingly to the opposite side channels of frame 26 and are bolted to the deck of the pontoon 30 at their lower ends, so that the conveyor discharges over the side of the pontoon.

As seen in FIGS. 2, 3 and 4, the center section 20 of the boom 14 has a hopper 19 into which the screen discharges. Plates 54 and 55 are lined with side wear plates 169, 170 respectively and the latter are bent inwardly at their lower ends (FIG. 4) so as to direct the discharge from the hopper onto the upper run of belt 96. Inclined plates 171, 172 interconnect the wear plates 169, 170 at the front end rear sides of the hopper and from the corresponding sides of the hopper thereat. The wear plates 169, 170 are secured to plates 54 and 55 as by bolts 173, and as seen in FIG. 4, lap the inside faces of the side channels thereat.

The apparatus is particularly useful in distributing the rock filter media in a filter basin 24 having a bottom which is covered with tiles indicated at 168. To prevent damage to the tiles and to facilitate flotation of the pontoon components of the apparatus, the filter basin, in accord with the process of the invention, is filled to the desired level 174 for the contemplated filter bed. This not only enables the pontoons to be floated, but, provides a protective layer of water above the tile bottom. As a result, the rock that falls to the bottom of the basin 24 and which otherwise would break the tile 162 but for the cushioning action of the water, is slowed down in its passage through the water. The water thus serves to retard free fall of the rock and protects the tile from damage by the falling rock. The water also serves to cushion the fall of the rock onto the already discharged media and serves to minimize breakage of the already pre-sized rock being distributed.

The water level in the basin may be maintained at approximately grade level throughout the process of distributing the media by withdrawing the water displaced in the basin by the delivered media through the normal pumping mechanism associated with the filter basin.

When the boom 14 is assembled at the job site, any suitable number of outer sections 37 may be secured to the center section 20 to provide the desired length of outer arm 77 for the particular job. A like number of outer sections 37 is usually secured to the inboard end of the outer center section 20 so as to balance the weight of the boom 14 and when necessary one or more extra outer sections 37 may be secured to the inboard end of the center section so as to offset the extra weight of the conveyor components that are suspended from the boom at the other end during operation. Pontoon 22 is normally capable of supporting the added weight on the outer arm 77 of the boom and which is transmitted to the pontoon through the supporting interconnecting brackets 145, 146.

By virtue of the turntable 13 arrangement, boom 14 can be swung horizontally in either direction indicated by two-headed arrow 175 through suitable operation of motor 15. This enables a greater area range of operation for any one location of the self-propelled land vehicle beside the basin before the need arises for relocating the vehicle to a different spot thereby.

Conveyor 17 is suspended from and is adapted for movement parallel to the longitudinal axis of the boom. A section of the upper run of the conveyor belt is disposed beneath the hopper 19 during operation of the device so as to at all times receive the discharge from the hopper. The auxiliary conveyor 27 is free to swing about the vertical axis of turntable 28 in either direction as indicated by two-headed arrow 176. The discharge end of the conveyor 28 may be controlled in its location manually, for example by manipulating the position of the pontoon from the sides of the filter basin by ropes 177. These ropes 177 are suitably secured to the pontoon 31 and may be manipulated by workers from the sides of the basin.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a process of forming a crushed and presized rock filter bed in a filter basin having a tile bottom, the improvement comprising filling the filter basin with water to about the grade level of rock desired in the filter basin thereby to cover the tile bottom with a protective layer of water having a surface at the grade level, conveying the crushed and presized rock from the side of the basin and from selected locations about the circumference of the basin and over the surface of the water, and distributing the conveyed rock to selected discrete locations throughout the basin to the desired grade level by selectively discharging the conveyed rock onto the surface of the protective layer of water therein.

2. In a process of forming a crushed and presized rock filter bed in a filter basin comprising filling the filter basin with water to approximately the grade level of rock desired in the completed filter bed, conveying the crushed and presized rock from selected locations about the circumference of the filter basin over the surface of the water therein to a distributing and discharging means, maintaining the means at a predetermined elevation with respect to the bottom of the filter basin by flotation of the means on the water within the filter basin, selectively moving the means on the water to universally position the means in various locations within the filter basin, distributing and discharging the conveyed rock to selected discrete locations throughout the filter basin to the desired grade level.

3. In a process of forming a crushed and presized rock filter bed in a filter basin comprising filling the filter basin with water to approximately the grade level of rock desired in the filter basin, conveying the crushed and presized rock from various locations about the circumference of the filter basin over the surface of the water therein to a distributing means, maintaining the distributing means at a predetermined elevation within the filter basin by flotation of the distributing means above the water within the filter basin, moving the means on the water to selected positions within the filter basin offset in respect to the center of the filter basin, and distributing the conveyed rock throughout the filter basin to the desired grade level by discharging to selected discrete locations the conveyed rock from the distributing means through the water within the filter basin.

4. In a process of forming a crushed presized rock filter bed in a filter basin comprising filling the filter basin with water to approximately the grade level of rock desired in the completed filter bed, selectively pivoting a conveyor about a vertical axis outwardly of the filter basin, selectively moving the conveyor in either direction horizontally and radially of the vertical axis to dispose the conveyor discharge within selected locations in the filter basin, selectively moving the vertical axis about the circumference of the filter basin, conveying the crushed and presized rock from selected locations around the circumference of the filter basin and over the surface of the water therein for discharging within the filter basin at selected discrete locations to the desired grade level.

5. In a process of forming a crushed presized rock filter bed in a filter basin comprising filling the filter basin with water to approximately the grade level of rock desired in the completed filter bed, selectively pivoting a conveyor about a vertical axis outwardly of the filter basin, selectively moving the conveyor in either direction horizontally and radially of the vertical axis to dispose the conveyor discharge within selected locations in the filter basin, selectively moving the vertical axis about the circumference of the filter basin, conveying the crushed and presized rock on the conveyor from selected locations around the circumference of the filter basin and over the surface of the water therein to a distributing and discharging means, maintaining the means at a predetermined elevation with respect to the bottom of the filter basin by flotation of the means on the water within the filter basin, selectively moving the means on the water about another vertical axis within the filter basin and offset from the center thereof, distributing and discharging the conveyed rock throughout the filter basin at selected discrete locations to the desired grade level.

6. In a process of forming a crushed presized rock filter bed in a filter basin comprising filling the filter basin with water to approximately the grade level of rock desired in the completed filter bed, selectively pivoting a conveyor about a vertical axis outwardly of the filter basin, selectively moving the conveyor in either direction horizontally and radially of the vertical axis to dispose the conveyor discharge end within selected locations in the filter basin, selectively moving the vertical axis about the circumference of the filter basin, maintaining the conveyor discharge end at a predetermined elevation with respect to the bottom of the filter basin by flotation of the conveyor discharge end on the water within the filter basin, conveying the crushed and presized rock on the conveyor from selected locations around the circumference of the filter basin and over the surface of the water therein to the conveyor discharge end, discharging the crushed and presized rock from the conveyor discharge end to a distributing and discharging means, maintaining the means at a predetermined elevation with respect to the bottom of the filter basin by flotation of the means on the water within the basin, selectively moving the means on the water about another vertical axis within the filter basin and offset from the center thereof, distributing and discharging the conveyed rock throughout the filter basin at selected discrete locations to the desired level.

References Cited by the Examiner

UNITED STATES PATENTS

| 409,636 | 8/89 | Dodge | 214—152 |
|---|---|---|---|
| 846,792 | 3/07 | Kennedy et al. | 214—10 |
| 964,429 | 7/10 | Johnston | 214—152 |
| 1,798,715 | 3/31 | Aldrich et al. | 214—17.6 |
| 2,503,210 | 4/50 | O'Halloran | 214—152 |
| 2,658,651 | 11/53 | Stryker | 214—17.6 X |
| 2,797,824 | 7/57 | Anschutz | 214—14 |
| 2,937,771 | 5/60 | Stock | 214—17.6 |

HUGO O. SCHULZ, *Primary Examiner.*